(12) United States Patent
Yang et al.

(10) Patent No.: US 11,153,473 B2
(45) Date of Patent: Oct. 19, 2021

(54) CONTROL METHOD, DEVICE AND ELECTRONIC APPARATUS FOR IMAGE ACQUISITION

(71) Applicant: Lenovo (Beijing) Co., Ltd., Beijing (CN)

(72) Inventors: Shuangxin Yang, Beijing (CN); Tingting Zhao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/730,515

(22) Filed: Dec. 30, 2019

(65) Prior Publication Data

US 2020/0213505 A1 Jul. 2, 2020

(30) Foreign Application Priority Data

Dec. 30, 2018 (CN) .......................... 201811648583.3

(51) Int. Cl.
*H04N 5/232* (2006.01)
*H04N 5/225* (2006.01)
*G06F 21/62* (2013.01)
*H04N 7/18* (2006.01)

(52) U.S. Cl.
CPC ..... *H04N 5/23203* (2013.01); *G06F 21/6218* (2013.01); *H04N 5/2258* (2013.01); *H04N 5/23248* (2013.01)

(58) Field of Classification Search
CPC ............. H04N 5/23203; H04N 5/2258; H04N 5/23248; H04N 5/23238; H04N 5/232933; H04N 5/23216; H04N 7/18; H04N 5/232935; G06F 21/6218

USPC ............................ 348/14.03, 333.02, 333.05
See application file for complete search history.

(56) References Cited

U.S. PATENT DOCUMENTS

| | | | |
|---|---|---|---|
| 2012/0113216 A1* | 5/2012 | Seen ................ | H04N 5/232933 348/38 |
| 2014/0232921 A1* | 8/2014 | Kim ................ | H04N 5/232945 348/333.05 |
| 2015/0015762 A1* | 1/2015 | Kim ................... | H04N 5/23245 348/333.05 |
| 2016/0142637 A1 | 5/2016 | Nuggehalli et al. | |

(Continued)

FOREIGN PATENT DOCUMENTS

| CN | 101833520 A | 9/2010 |
|---|---|---|
| CN | 104333704 A | 2/2015 |
| CN | 106020909 A | 10/2016 |

(Continued)

*Primary Examiner* — Albert H Cutler
(74) *Attorney, Agent, or Firm* — Anova Law Group, PLLC

(57) ABSTRACT

The present disclosure provides a control method. The method includes acquiring a first trigger instruction; executing a first function module in response to the first trigger instruction, the first function module calling one or more first image acquisition devices; acquiring a second trigger instruction during the operation of the first function module; and executing a second function module in response to the second trigger instruction, the second function module calling one or more second image acquisition devices, and the first function module being different from the second function module. The one or more first image acquisition devices and the one or more second image acquisition devices are connected to a same electronic device.

19 Claims, 21 Drawing Sheets

(56) References Cited

U.S. PATENT DOCUMENTS

2019/0007605 A1* 1/2019 Choe .................. H04N 5/23225
2019/0286954 A1* 9/2019 Hsu .......................... G06K 9/78

FOREIGN PATENT DOCUMENTS

| CN | 106101525 A | | 11/2016 |
|----|-------------|---|---------|
| CN | 107018334 A | * | 8/2017 |
| CN | 107222677 A | | 9/2017 |
| CN | 108900790 A | | 11/2018 |

* cited by examiner

CONTROL METHOD, DEVICE AND ELECTRONIC APPARATUS FOR IMAGE ACQUISITION

CROSS-REFERENCES TO RELATED APPLICATION

This application claims priority to Chinese Patent Application No. 201811648583.3, entitled "Control Method and Apparatus, and Electronic Device," filed on Dec. 30, 2018, the entire content of which is incorporated herein by reference.

FIELD OF TECHNOLOGY

The present disclosure relates to the field of image processing technology and, more specifically, to a control method and apparatus, and an electronic device.

BACKGROUND

Many electronic devices, such as SLR cameras, smartphones, etc., have image acquisition functions. Users can use the image acquisition function in the electronic device to acquire images.

Currently, there are not many methods for acquiring images using the image acquisition function of a device.

BRIEF SUMMARY OF THE DISCLOSURE

One aspect of the present disclosure provides a control method. The method includes acquiring a first trigger instruction; executing a first function module in response to the first trigger instruction, the first function module calling one or more first image acquisition devices; acquiring a second trigger instruction during the operation of the first function module; and executing a second function module in response to the second trigger instruction, the second function module calling one or more second image acquisition devices, and the first function module being different from the second function module. The one or more first image acquisition devices and the one or more second image acquisition devices are connected to a same electronic device.

Another aspect of the present disclosure provides a control apparatus. The control apparatus includes a first acquisition module configured to acquire a first trigger instruction; a first execution module configured to execute a first function module in response to the first trigger instruction, the first function module calls one or more first image acquisition devices; a second acquisition module configured to acquire a second trigger instruction; and a second execution module configured to execute a second function module in response to the second trigger instruction, the second function module calls one or more second image acquisition devices, and the first function module being different from the second function module. Further, the one or more first image acquisition devices and the one or more second image acquisition device are connected to a same electronic device.

Another aspect of the present disclosure provides an electronic device. The electronic device includes a memory configured to store a program; a processor configured to execute the program to: acquire a first trigger instruction; execute a first function module in response to the first trigger instruction, the first function module calling one or more first image acquisition devices; acquire a second trigger instruction during the operation of the first function module; and execute a second function module in response to the second trigger instruction, the second function module calling one or more second image acquisition devices, and the first function module being different from the second function module. The one or more first image acquisition devices and the one or more second image acquisition device are connected to the electronic device.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION

Figure 1A:
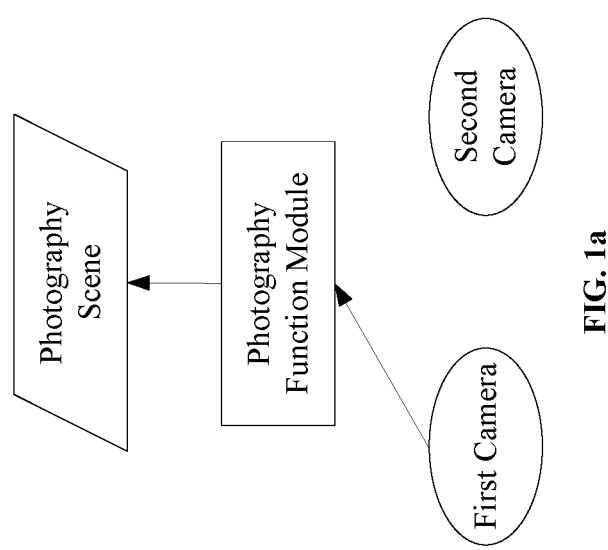
FIGS. 1a-1b are diagrams illustrating an image acquisition device performing a single process and a single task.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Currently, an application may often only perform a single process and a single task. The single process may be that an electronic device (such as a smartphone) can execute an application (such as a camera application or an instant messaging application) in the foreground. The single task may refer to the creation of a task by a functional module in an application that the electronic device can execute in the foreground (e.g., creating an image acquisition task in a photography function module).

In the embodiments of the present disclosure, a software module, a hardware module, or a module of software in combination with relevant hardware, capable of calling one or more image acquisition devices in an application may be referred to as a function module. Further, modules that can call different image acquisition devices may be referred to as modules with different functions. Furthermore, function modules that can call the same image acquisition devices, but the functions of the one or more image acquisition devices may be different may also be referred to as modules with different functions. For example, a image capture application may include a video function module, a photography function module, a beauty function module, etc.

The foreground mentioned in the embodiments of the present disclosure may refer to a visual and basic operation platform that an electronic device can present to a user. An application running in the foreground can be referred to as a foreground application. The user can directly view the foreground application and directly operate the foreground application.

An application running in the background may be referred to as a background application, and a background application may be a program that a user cannot directly access.

In some embodiments, the background application may be switched to the foreground application, or the foreground application may be switched to the background application.

Taking an application such as a camera application as an example, the imaging application may include a time-lapse photography function module, a video function module, a photography function module, a beauty function module, and a panorama function module. If the camera application is a foreground application, a user may execute any of the function modules mentioned above. For example, if the user presses the button corresponding to the photography function module of the camera application, the photography function module can be executed to perform the photography function. In the process of executing the photography function, if the user touches the corresponding button of the video function module again, the camera application may exit the photography function module and execute the video function module to perform function of video recording.

The image acquisition method in conventional technology may only perform a single process and a single task for multiple applications.

For example, when executing the video function module in the camera application, if the user starts the instant messaging application during the video recording process, the camera application may be switched from the foreground application to the background application, and the instant messaging application may become the foreground application. When the camera application switches from the foreground application to the background application, resources, such as the image acquisition device, may be released. That is, the video function module may stop to execute. Further, if the instant messaging application needs to perform video chat, the instant messaging application may occupy resources, such as the image acquisition device.

As such, the image acquisition method mentioned above can only perform a single process and a single task, such that acquiring images using the image acquisition function is relatively simple.

Figure 1B:
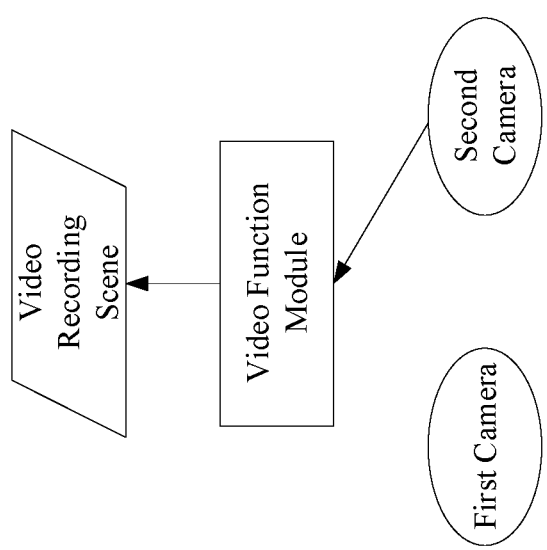

Taking an application such as a camera application as an example, as shown in FIGS. 1a-1b, which are diagrams illustrating an image acquisition device performing a single process and a single task. The camera application may include a video function module and a photography function module. In a photography scene, the camera application can execute the photography function module. Assuming the photography function module can call the first camera to acquire images as shown in FIG. 1a. If video recording is needed in the process of executing the photography function module, that is, the camera application may be in a video recording scene as shown in FIG. 1b, then the video function module may be executed. At this time, the photography function module will release the resource of the first camera, such that the photography function module may no longer acquire images through the first camera. Further, the video function module can call the second camera and acquired images through the second camera. The camera application cannot execute the photography function module and the video function module at the same time. That is, the first camera and the second camera cannot be called at the same time.

In view of the foregoing, the embodiments of the present disclosure provide a control method, a control apparatus, and an electronic device. The electronic device can be an electronic device such as a desktop computer, a mobile terminal (e.g., a smartphone), an iPad, etc.

In some embodiments, the control apparatus may be a client running on an electronic device, and the client may be an application client or a web client. In some embodiments, the control apparatus may be a plug-in running on a client.

In some embodiments, the control method provided in the embodiments of the present disclosure can be applied to various application scenarios. The embodiments of the present application provide, but are not limited to, the following application scenarios.

In the first application scenario, the control method provided in the embodiments of the present disclosure can be applied to a single-process multitasking application scenario.

The control method provided in the embodiments of the present disclosure can perform a single process and multiple tasks for one application. That is, multiple function modules in the same application can be executed at the same time. In particular, if a second function module needs to be executed in the process of executing a first function module, the situation of exiting the first function module or unable to call the second function module can be avoided. In the embodiments of the present disclosure, a plurality of function modules can be executed simultaneously, and the first function module and the second function module can be any two function modules in the plurality of function modules.

Taking an application such as a camera application as an example, the camera application may include a video function module and a photography function module. The camera application can execute the photography function module. Assuming the photography function module can call the first camera to acquire image; if video recording is needed while executing the photography function module, the video function module may be executed. At this time, the photography function module may not release the resource of the first camera, such that the photography function module may continue to acquire images through the first camera, and the video function may call the second camera and acquire images through the second camera. The camera application may execute the photography function module and the video function module simultaneously, that is, the first camera and the second camera may be called at the same time.

In the first application scenario, the control method provided in the embodiments of the present disclosure can be applied to a multi-process single-task application scenario.

The control method provided in the embodiments of the present disclosure can execute multiple processed and single tasks. The multi-process single task mentioned in the embodiments of the present disclosure may be that multiple applications can be executed simultaneously in an electronic device, and the multiple applications can include a foreground application and one or more background applications. In particular, each application can execute a function module. Each application can occupy the corresponding image acquisition device and other resources, and the background application may not release its own image acquisition device and other resources. That is, the background application may still acquire images through the image acquisition device that it occupies.

Taking the first application as the camera application and the second application as the instant messaging application as an example, if the camera application is executing the video function module, and video function module may call the corresponding image acquisition device (e.g., a camera) to acquire images. If a video call request is received from the instant messaging application while the camera application executes the video function module and the user decides to answer the video call request, the instant messaging application may execute the video communication function module, and the video communication function module may call the corresponding image acquisition module (e.g., a camera) to acquire images. At this time, the camera application may become the background application, and the video function module may continue to occupy resources such as the corresponding image acquisition device and acquire images through the corresponding image acquisition device. As such, the video function module of the camera application can the video communication function module of the instant messaging application can be executed at the same time, and acquire images through the corresponding image acquisition devices.

In the third application scenario, the control method provided in the embodiments of the present disclosure can be applied to a multi-process multitasking application scenario.

The control method provided in the embodiments of the present disclosure can perform multiple processes and multiple tasks. The multi-process multitasking mentioned in the embodiments of the present disclosure may be that multiple applications can be executed simultaneously in an electronic device, and the multiple applications can include a foreground application and one or more background applications. In particular, each application can execute multiple function modules. Each function module of each application can occupy the corresponding image acquisition device and other resources, and the background application may not release its own image acquisition device and other resources. That is, the background application may still acquire images through the image acquisition device that it occupies.

Taking the first application as the camera application and the second application as the instant messaging application as an example, the photography function module and the video function module of the camera application, and the video communication function module and the front camera function module of the instant messaging application can be executed simultaneously.

Figure 2:
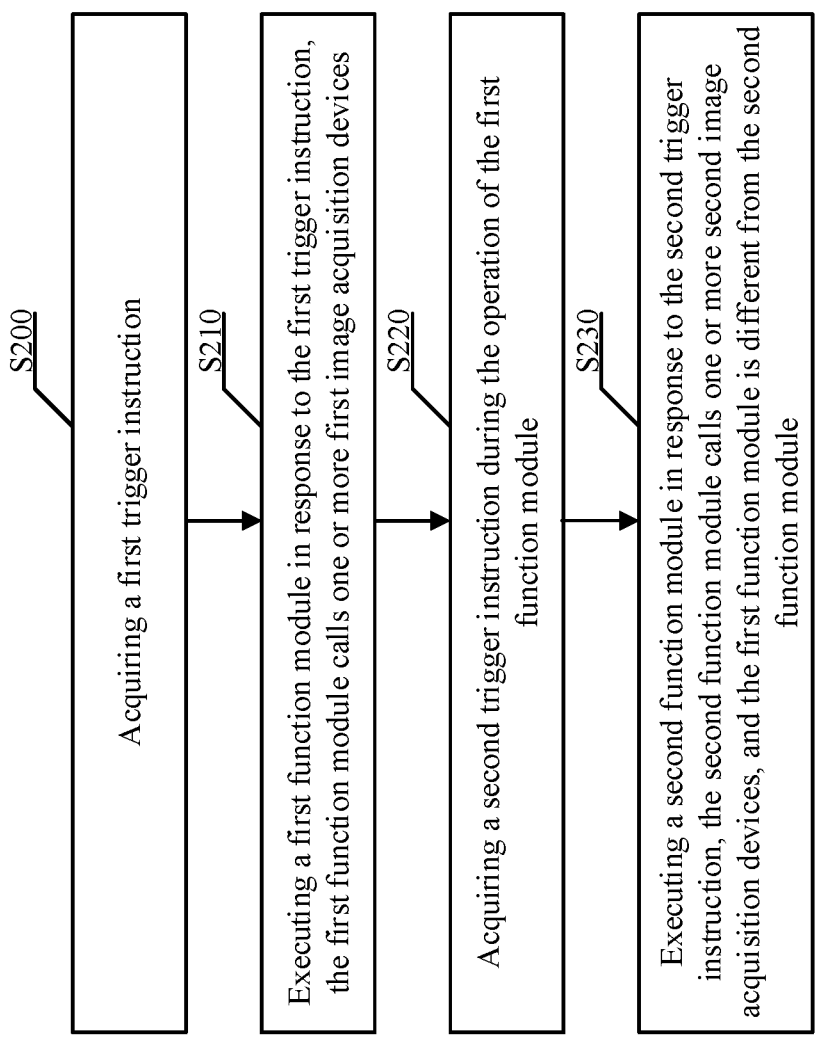
FIG. 2 is a flowchart illustrating an implementation method of a control method according to an embodiment of the present disclosure.

The control method provided in the embodiments of the present disclosure will be described below with reference to the three application scenarios described above. Referring to FIG. 2, which is a flowchart illustrating an implementation method of a control method according to an embodiment of the present disclosure. The control method is described in detail below.

S200, acquiring a first trigger instruction.

S210, executing a first function module in response to the first trigger instruction, the first function module may call one or more first image acquisition devices.

In the embodiments of the present disclosure, a module capable of calling one or more image acquisition devices in an application may be referred to as a function module. Further, modules that can call different image acquisition devices may be referred to as modules with different functions. Furthermore, function modules that can call the same image acquisition devices, but the functions of the one or more image acquisition devices may be different may also be referred to as modules with different functions.

In some embodiments, the functions of an image acquisition device may include any of the following functions such as calculating the depth of field of the acquired image; and implementing the background blurring of the acquired image.

Taking the camera application as an example, the function modules in the camera application may include one or more of a panorama function module, a beauty function module, a photography function module, a video function module, or a time-lapse video function module.

In some embodiments, the first function module mentioned above may include different function modules for different applications. For example, for the camera application, the first function module may be the photography function module; for the instant messaging application, the first function module may be the video communication function module. In some embodiments, the second function module may be a function module different from the first function module.

The first trigger instruction may be acquired by perform S200. In some embodiments, the embodiments of the present disclosure provide, but are not limited to, the following methods for acquiring the first trigger instruction.

In the first method, the user may touch a button corresponding to the first function module, and the electronic device may generate the first trigger instruction. In the second method, the user may issue a first voice message, and the electronic device may use the first voice message as the first trigger instruction. In the third method, the user may issue a first predetermined gesture, and the electronic device may generate the first trigger instruction after acquiring the first predetermined gesture. In the third method, if the user's detected first touch information satisfies a first predetermined condition, the first trigger instruction may be acquired. The first touch information may include one or more of a touch duration, a touch strength, and a touch trajectory.

Figure 3:
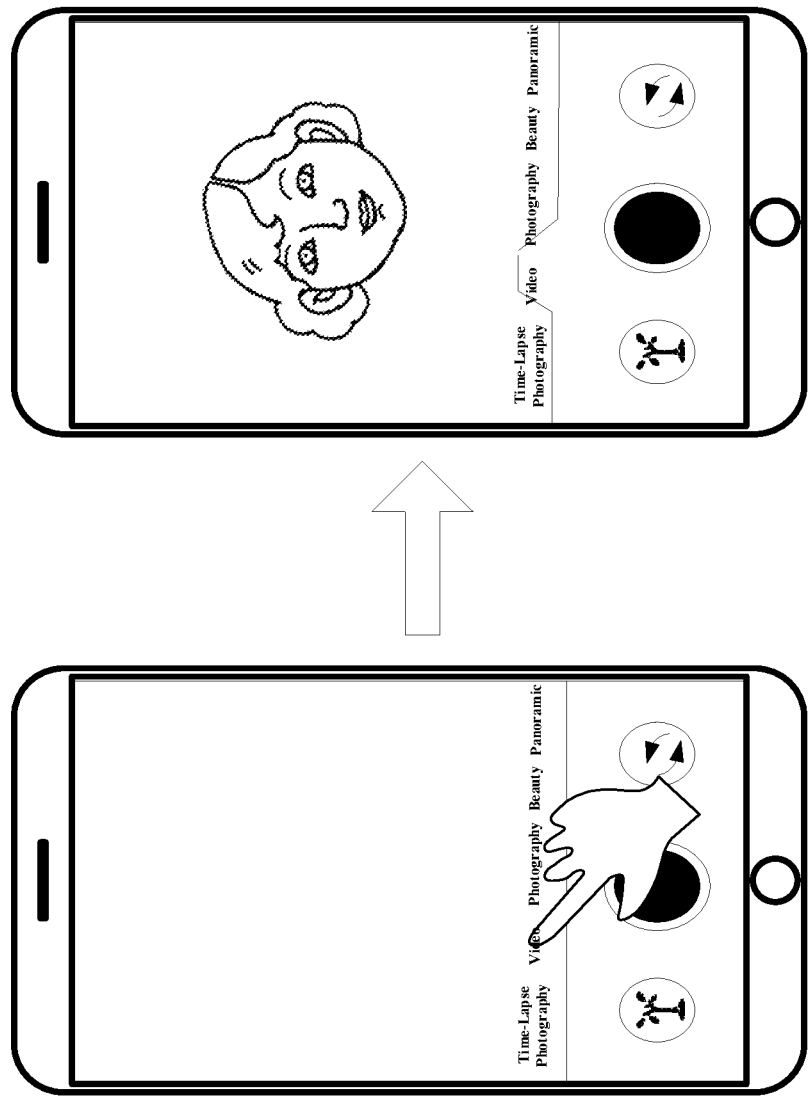
FIG. 3 is a process diagram of a user triggering a photography function module of a camera application by pressing a corresponding button.

As shown in FIG. 3, which is a process diagram of a user triggering a photography function module of a camera application by pressing a corresponding button.

As shown in the diagram on the right of FIG. 3, the photography function module may correspond to the "photography" virtual button, the panorama function module may correspond to the "panoramic" virtual button, the beauty function module may correspond to the "beauty" virtual button, the video function module may correspond to the "video" virtual button, and the time-lapse photography function module may correspond to the "time-lapse photography" virtual button.

If the first function module is the video function module and the user clicks the "video" virtual button, the electronic device may acquire the first trigger instruction.

As shown in the diagram on the left of FIG. 3, the user may touch the "video" virtual button of the camera application to execute the first function module. The first function module may call one or more first acquisition devices to acquire the image shown in the diagram on the left of FIG. 3.

The image acquisition device mentioned in the embodiments of the present disclosure can be used to acquire an image. In some embodiments, the image acquisition device may be a camera. In some embodiments, the image acquisition device may be an image acquisition component, for example, a CMOS component. For example, a three-dimensional (3D) structure light may be irradiated onto a real object, and the image acquisition component may acquire the outline of the real object based on the 3D structure light.

In some embodiments, the image acquired by the first image acquisition devices may include one or more of an image or a video.

S220, acquiring a second trigger instruction during the execution of the first function module.

The second trigger instruction may be acquired by performing S220. In some embodiments, the embodiments of the present disclosure provide, but are not limited to, the following methods for acquiring the second trigger instruction.

In the first method, the user may touch a button corresponding to the second function module, and the electronic device may generate the second trigger instruction. In the second method, the user may issue a second voice message, and the electronic device may use the second voice message as the second trigger instruction. In the third method, the user may issue a second predetermined gesture, and the electronic device may generate the second trigger instruction after acquiring the second predetermined gesture. In the third method, if the user's detected second touch information satisfies a second predetermined condition, the second trigger instruction may be acquired. The second touch information may include one or more of a touch duration, a touch strength, and a touch trajectory.

In some embodiments, the first voice message may be different from the second voice message; the first predetermined gesture may be different from the second predetermined gesture; and the first predetermined condition may be different from the second predetermined condition.

S230, executing a second function module in response to the second trigger instruction, the second function module may call one or more second image acquisition devices, and the first function module may be different from the second function module.

In some embodiments, the one or more first image acquisition devices and the one or more second image acquisition devices may be connected to the same electronic device.

In some embodiments, the first function module may be different from the second function module.

For example, if user A receives and accepts a video call request sent by user B during the video recording process through the video function module in the camera application, the video communication function module in the instant messaging application may be executed while the video function module continues to record the video.

In some embodiments, the image acquired by the second image acquisition devices may include one or more of an image or a video.

It should be noted that, in the embodiments of the present disclosure, the first image acquisition devices and the second image acquisition devices being connected to the same electronic device may include the following situations.

In the first situation, one or more image acquisition devices of the first image acquisition devices and the second image acquisition devices may be integrated in the same electronic device.

For example, the first image acquisition devices and the second image acquisition devices may be directed connected to a processor or a motherboard of an electronic device.

In the second situation, one or more image acquisition devices in the first image acquisition devices and the second image acquisition devices may be connected to the same electronic device through a data cable (e.g., a USB data cable).

In the third situation, one or more image acquisition devices in the first image acquisition devices and the second image acquisition devices may be connected to the same electronic device through wireless communication.

In some embodiments, the wireless communication may be any one of Bluetooth, near field communication (NFC), and Wi-Fi.

In summary, the embodiments of the present disclosure do not specifically limit the specific connection manner between the image acquisition device and the electronic device.

An embodiment of the present application provides a control method, which includes acquiring a first trigger instruction; executing a first function module in response to the first trigger instruction, the first function module may call one or more first image acquisition devices; acquiring a second trigger instruction during the execution of the first function module; and executing a second function module in response to the second trigger instruction, the second function module may call one or more second image acquisition devices, and the first function module may be different from the second function module. By using the control method provided in the embodiment of the present disclosure, two or more function modules may be executed at the same time, and different function modules may call different image acquisition devices to acquire images. Compared with the conventional technology in which only one function module can be executed at a time to call the image acquisition device to acquire images, the embodiment of the present disclosure provides another method for acquiring images, such that the method of using the image acquisition device to acquire images can be more sophisticated.

In the control method embodiments described above, in some embodiments, the first function module and the second function module may belong to different function modules of the same application.

For example, the application may be a camera application program, the first function module may be a photography function module of the camera application, and the second function module may be a video function module of the camera application.

In other embodiments, the first function module and the second function module may belong to different applications. For example, the first function module may belong to the first application, the second function module may belong to the second application, and the first application may be different from the second application. In some embodiments, if the first function module and the second function module belong to different applications, the first function module and the second function module may be the same or different.

For example, the first application may be a camera application, the first function module may be a photography function module of the camera application, the second application may be an instant messaging application, and the second function module may be a photography function module of the instant messaging application. As such, if the first function module and the second function module belong to different applications, the first function module and the second function module may be the same.

Further, the first application may be a camera application program, the first function module may be a photography function module of the camera application, the second application may be an instant messaging application, and the second function module may be a video communication function module of the instant messaging application. As such, if the first function module and the second function module belong to different applications, the first function module and the second function module may be different.

The control method provided in the embodiments of the present disclosure will be described below with respect to "the first function module and the second function module may belong to different function modules of the same application".

When the first function module and the second function module may belong to different function modules of the same application, the foregoing control method embodiments may further include calling an application, the application including at least the first function module and the second function module. In addition, the first trigger instruction may be a trigger instruction determined based on the acquired first input operation, and the first input operation may be used to select the first function module of the application. Further, the second trigger instruction may be a trigger instruction determined based on the acquired second input operation, and the second input operation may be used to select the second function module of the application.

In some embodiments, the first input operation may be an operation of touching a button corresponding to the first function nodule; or, the first voice message received by the electronic device may be the first input operation; or, the first predetermined gesture may be the first input operation; or, the first touch information may be the first input operation.

In some embodiments, the second input operation may be an operation of touching a button corresponding to the second function module; or, the second voice message received by the electronic device may be the second input operation; or, the second predetermined gesture may be the second input operation; or, the second touch information may be the second input operation.

Figure 4:
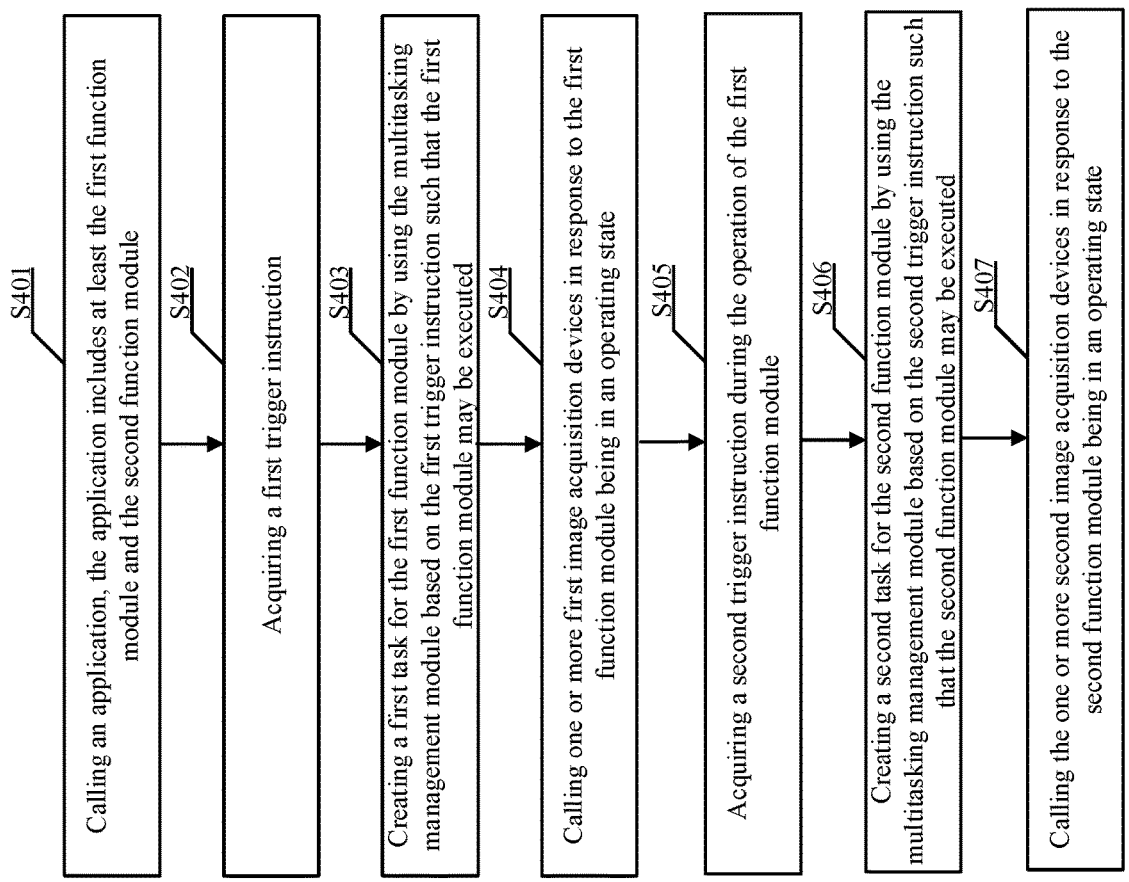
FIG. 4 is a flowchart illustrating another implementation method of the control method according to an embodiment of the present disclosure.

In order to achieve the ability to execute multiple function modules in the same application, in some embodiments, the application can also include a multitasking management module, which can create different tasks for different function modules. As shown in FIG. 4, which is a flowchart illustrating another implementation method of the control method according to an embodiment of the present disclosure. The control method is described in detail below.

S401, calling an application, the application includes at least the first function module and the second function module.

In some embodiments, calling the application may be that the user inputs a third voice message, a third predetermined gesture, or third touch information to start the application, such that the application may be in an operating state.

S402, acquiring a first trigger instruction.

For details, reference may be made to the description of S200, which will not be repeated here.

S403, creating a first task for the first function module by using the multitasking management module based on the first trigger instruction such that the first function module may be executed.

S404, calling one or more first image acquisition devices in response to the first function module being in the operating state.

In some embodiments, the first function module may be in an operating state, and may initial a request to call the one or more first acquisition devices to an operating system of the electronic device. After receiving the request, the operating system may detect whether the one or more first acquisition devices to be called are idle. In response to the one or more first acquisition devices being idle, the one or more first acquisition devices may be assigned to the first function module. That is, the first function module may acquire images through the one or more first acquisition devices.

Alternatively, the operating system may send the request to a hardware resource management module, and the hardware resource management module may detect whether the one or more first acquisition devices to be called are idle.

S405, acquiring a second trigger instruction during the operation of the first function module.

For details, reference may be made to the description of S220, which will not be repeated here.

S406, creating a second task for the second function module by using the multitasking management module based on the second trigger instruction such that the second function module may be executed.

In some embodiments, there may or may not be conflicts between the one or more first image acquisition devices called by the first function module and the one or more second image acquisition devices called by the second function module.

For example, the image acquisition device may be a camera in a smartphone. Assuming the smartphone includes three cameras, namely, a first camera, a second camera, and a third camera. Assuming a plurality of first image acquisition devices called by the first function module are the first camera and the second camera, respectively. If the second function module also needs to call two second image acquisition devices, such as the third camera and the second camera. As such, the camera already called by the first function module and the cameras need to be called by the second function module both include the second camera. In addition, if the second function module also need to call two second image acquisition devices, such as the first camera and the second camera, then the camera already called by the first function module is exactly the same as the cameras need to be called by the second function module.

In summary, there is a conflict if at least one of the first image acquisition devices called by the first function module and at least one of the second image acquisition devices called by the second function module are the same.

Continuing with the above example. If the second image acquisition devices need to be called by the second function module is the third camera, then the cameras already called by the first function module and the camera needs to be called by the second function module are different. As such, there is no conflict.

In summary, there is no conflict if at least one of the first image acquisition devices called by the first function module and at least one of the second image acquisition devices called by the second function module are different.

Based on the above situation, the embodiments of the present disclosure can determine whether to call one or more second image acquisition devices based on whether one or more first image acquisition devices called by the first function module may have conflict with one or more second image acquisition devices called by the second function module. Therefore, in another embodiment of the present disclosure, a process of creating a second task for the second function module by using the multitasking management module based on the second trigger instruction will be described below.

The process of creating a second task for the second function module by using the multitasking management module based on the second trigger instruction may include various implementation methods. The embodiments of the present disclosure provide, but are not limited to the following implementation methods.

In the first implementation method, a second task may be created for the second function module if the one or more second image acquisition devices do not conflict with the one or more first image acquisition devices.

In some embodiments, the specific process may include the following.

C1, determining the one or more second image acquisition devices to be called by the second function module.

In some embodiments, C1 may determine the specific one or more second image acquisition devices to be called by the second function module. Subsequently, whether the second image acquisition devices to be called conflict with the first image acquisition devices called by the first function module may be determined based on the one or more second image acquisition devices to be called.

In some embodiments, the correspondence between the function modules and the image acquisition device can be set in advance. As shown in Table 1, which illustrates the correspondence between the function modules and the image acquisition device.

TABLE 1

Correspondence between Each Function Module and Image Acquisition Device

| Function Module | Image Acquisition Device |
|---|---|
| Panoramic Function Module | First camera |
| Beauty Function Module | Second Camera and Third Camera |
| Photography Function Module | Third Camera, Fourth Camera, and Fifth Camera |
| Video Function Module | Fourth Camera |

In some embodiments, the second image acquisition devices corresponding to the second function module may be determined based on the correspondence between each function module and the image acquisition device. Taking Table 1 as an example, assuming that the second function module is a panoramic function module, based on the correspondence between the panoramic function module and image acquisition device provided above, the second image acquisition devices may be determined to be the first camera.

It should be noted that the Table 1 mentioned above is merely an exemplary description of the correspondence between the function module and the image acquisition device, and the embodiments of the present disclosure may be adjusted based on the actual applications. For example, the correspondence in Table 1 may be increased, decreased, or adjusted.

C2, creating a second task for the second function module if the one or more second image acquisition devices do not conflict with the one or more first image acquisition devices.

In some embodiments, if it is determined that the one or more second image acquisition devices do not conflict with the one or more first image acquisition devices, the second task may be created for the second function module. Do not conflict in the present embodiment may be that one or more first image acquisition devices and one or more second image acquisition devices that are called are all different.

In some embodiments, if it is determined that the one or more second image acquisition devices conflict with the one or more first image acquisition devices, feedback information may be provided to indicate that the second image acquisition devices conflict with the first image acquisition devices.

Still taking Table 1 as an example for illustration. Assuming the first function module is the beauty function module, based on the correspondence shown in Table 1, the first image acquisition devices being called may be determined to be the second camera and the third camera. Assuming the second function module is the photography function module, based on the correspondence shown in Tale 1, the second image acquisition devices being called may be determined to be the third camera, the fourth camera, and the fifth camera. Since the two first image acquisition devices and three second image acquisition devices include the same camera (the third camera), there is a conflict.

Assuming the first function module is the beauty function module, based on Table 1, based on the correspondence shown in FIG. 1, the first image acquisition devices being called may be determined to be the second camera and the third camera. Assuming the second function module is the video function module, based on the correspondence shown in Tale 1, the second image acquisition devices being called may be determined to be the fourth camera. Since the two first image acquisition devices and one second image acquisition devices include completely different cameras, there is no conflict. In this case, the second task can be created.

In the second implementation method, a second task may be created for the second function module if the second function module and the first function module meet a coexisting condition.

In some embodiments, the coexistence relationship between different function modules can be set in advance, and when the second function module is executed, it can be determined whether the second function module can coexist with the first function module. If the second function module and the first function module can coexist, that is, the coexistence relationship is satisfied, the second task may be created for the second function module.

The embodiments of the present disclosure mention that multiple function modules may satisfy the coexistence relationship, which can explain that the image acquisition devices called by the multiple function modules may be completely different.

In some embodiments, if the second function module and the first function module cannot coexist, that is, the coexistence relationship is not satisfied, feedback information can be provided to indicate that the second function module and the first function module cannot coexistence, and the second task cannot be created for the second function module.

In some embodiments, the coexistence relationship between the different function modules that may be set and stored in advance can be as shown in Table 2, which illustrates the coexistence relationship between different function modules.

TABLE 2

Coexistence Relationship between Different Function Modules

| Function Modules | Coexistence? |
|---|---|
| Panoramic Function Module and Beauty Function Module | Yes |
| Panoramic Function Module and Photography Function Module | Yes |
| Panoramic Function Module and Video Function Module | Yes |
| Beauty Function Module and Photography Function Module | No |
| Beauty Function Module and Video Function Module | Yes |
| Photography Function Module and Video Function Module | No |

In some embodiments, whether different function modules can coexist may be determined based on the coexistence relationship between different function modules.

Taking Table 2 as an example. Assuming the first function module is the panoramic function module and the second function module is the video function module. Based on the coexistence relation between the panoramic function module and the video function module shown in Tale 2, it may be determined that the panoramic function module and the video function module can coexist. As such, the second task may be created for the second function module.

Assuming the first function module is the photography function module and the second function module is the video function module. Based on the coexistence relation between the photography function module and the video function module shown in Tale 2, it may be determined that the photography function module and the video function module cannot coexist. As such, the second task may not be created for the second function module.

In the third implementation method, if one or more first image acquisition devices being called conflict with one or more second image acquisition devices, whether to create the second task for the second function module may be determined based on whether the conflicting image acquisition devices (i.e., the one or more first image acquisition devices and the one or more second image acquisition devices including the same image acquisition device) have the same function. The specific process may be as follow.

D1, determining the one or more second image acquisition devices being called by the second function module.

In some embodiments, the specific implementation process of D1 corresponds to C1 in the foregoing embodiment. For details, reference may be made to the foregoing description, and details will not be described herein again.

D2, determining a conflicting target image acquisition device if the one or more second image acquisition devices conflict with the one or more first image acquisition devices.

In some embodiments, if it is determined that one or more second image acquisition devices conflict with the one or more first image acquisition devices, the conflicting target image acquisition device may be determined. In the present embodiment, conflict may include situations where the one or more first image acquisition devices and the one or more second image acquisition devices being called are all the same or partially the same. The conflicting target image acquisition device may be an image acquisition device in which the one or more first image acquisition devices and the one or more second image acquisition devices are all the same or partially the same.

In some embodiments, if it is determined that one or more second image acquisition devices conflict with the one or more first image acquisition devices, feedback information may be provided to indicate that the second image acquisitions conflict with the first image acquisition devices.

Still taking Table 1 as an example for illustration, assuming the first function module is the beauty function module, based on the correspondence shown in Table 1, the first image acquisition devices being called may be determined to be the second camera and the third camera. Assuming the second function module is the photography function module, based on the correspondence shown in Tale 1, the second image acquisition devices being called may be determined to be the third camera, the fourth camera, and the fifth camera. Since the two first image acquisition devices and three second image acquisition devices being called include the same camera (the third camera), therefore, it may be determined that the conflicting target image acquisition device is the third camera.

D3, creating the second task for the second function module if the function of the target image acquisition device set by the second function module is consistent with the function of the target image acquisition device set by the first function module.

In some embodiments, whether to create the second task for the second function module may be determined based on whether the function of the target image acquisition device set by the second function module is consistent with the function of the target image acquisition device set by the first function module. If the function of the target image acquisition device set by the second function module is consistent with the function of the target image acquisition device set by the first function module, the second task may be created for the second function module.

In some embodiments, if the function of the target image acquisition device set by the second function module is inconsistent with the function of the target image acquisition device set by the first function module, feedback information may be provided to indicate that the function of the target image acquisition device set by the second function module is inconsistent with the function of the target image acquisition device set by the first function module.

Still taking Table 1 as an example for illustration, assuming the first function module is the beauty function module, based on the correspondence shown in Table 1, the first image acquisition devices being called may be determined to be the second camera and the third camera. Assuming the second function module is the photography function module, based on the correspondence shown in Tale 1, the second image acquisition devices being called may be determined to be the third camera, the fourth camera, and the fifth camera. Since the two first image acquisition devices and three second image acquisition devices being called include the same camera (the third camera), therefore, it may be determined that the conflicting target image acquisition device is the third camera.

Assuming the function of third camera set by the first function module is to calculate the depth of field of the acquired image, and the function of third camera set by the second function module is also to calculate the depth of field of the acquired image, the second task may be created for the second function module.

In some embodiments, it can be understood that, if the function of the target image acquisition device set by the second function module is inconsistent with the function of the target image acquisition device set by the first function module, even if the second task is created, the second function module may not normally call the one or more second image acquisition devices. In some embodiments, the second function module may be kept in the operating state. In this case, even if the second function module is in the operating state, the image may not be acquired. In some embodiments, if the function of the target image acquisition device set by the second function module is inconsistent with the function of the target image acquisition device set by the first function module, the second task may not be created for the second function module. In some embodiments, if the function of the target image acquisition device set by the second function module is inconsistent with the function of the target image acquisition device set by the first function module and the second task is already created, the second task may be may be turned off.

In some embodiments, closing the second task may include the following scenarios.

In the first optional scenario, when the second task is completed, the second task may be closed. For example, the second task may be a photographing task. When the photographing is completed, the photographing task may be closed.

In the second optional scenario, when the second task is an invalid task (i.e., if the function of the target image acquisition device set by the second function module is inconsistent with the function of the target image acquisition device set by the first function module, the second task may be an invalid task), the second task may be closed.

S407, calling the one or more second image acquisition devices in response to the second function module being in an operating state.

In some embodiments, the one or more first image acquisition devices and one or more second image acquisition devices may be connected to the same electronic device.

In some embodiments, the second function module may be in an operating state, and may initiate a request for calling the one or more second image acquisition devices to an operating system of the electronic device. After receiving the request, the operating system may detect whether the one or more second image acquisition devices to be called are idle. If the one or more second image acquisition devices to be called are idle, the one or more second image acquisition devices may be assigned to the second function module. That is, the second function module may acquire images through the one or more second image acquisition devices.

Alternatively, the operating system may send the request to a hardware resource management module, and the hardware resource management module may detect whether the one or more second image acquisition devices to be called are idle.

The control method shown in FIG. 4 will be described below with reference to FIGS. 1a-1b.

Figure 5:
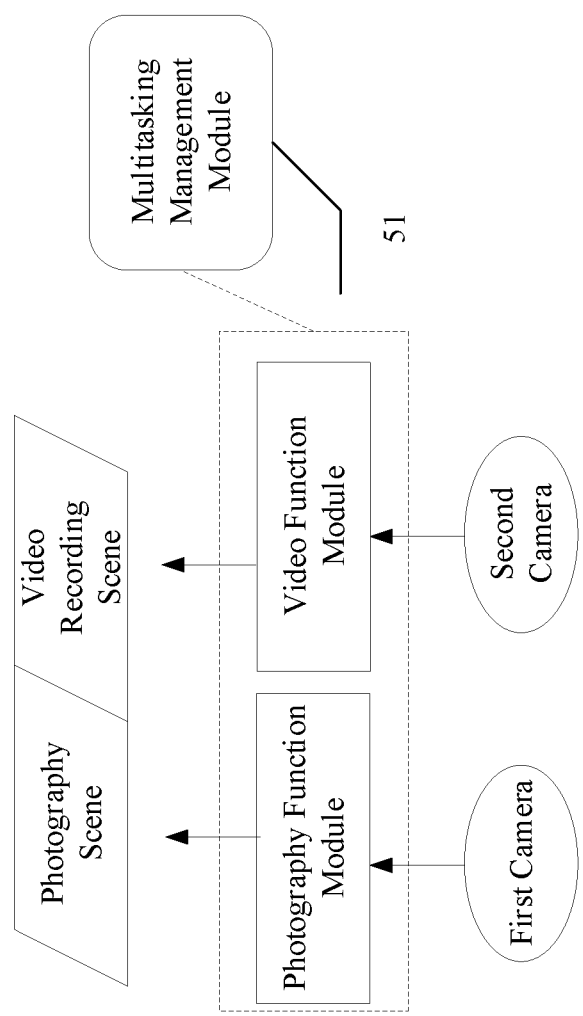
FIG. 5 is a diagram illustrating the control method applied to the camera application according to an embodiment of the present disclosure.

FIG. 5 is a diagram illustrating the control method applied to the camera application according to an embodiment of the present disclosure.

The camera application may include a video function module and a photography function module. In a photography scene, the user may touch a button corresponding to the photography function module such that the electronic device may acquire a first trigger instruction. A multitasking management module 51 may create a first task for the photography function module based on the first trigger instruction, such that the photography function module may be executed. When the photography function module is in the operating state, the first camera may be called. During the operation of the photography function module, the user may touch a button corresponding to the video function module such that the electronic device may acquire a second trigger instruction. The multitasking management module 51 may create a second task for the video function module based on the second trigger instruction, such that the video function module may be in an operating state. During the operation of the video function module, the second camera may be called.

As such, the photography function module and the video function module may respectively call the first camera and the second camera at the same time, thereby achieving the purpose of simultaneously operating multiple function modules in the same application.

In the application scenario where multiple function modules may be operated in the same application, in some embodiments, the multitasking management module mentioned in the previous embodiment may also be used to switch instructions. The specific process may include switching the first task and the second task by using the multitasking management module in response to the multitasking management module acquiring a switching instruction.

In some embodiments, after the multitasking management module creates the first task and the second task, the multitasking management module may also switch the first task and the second task based on the acquired switching instruction.

In some embodiments, there are many methods to acquire the switching instruction. The embodiments of present disclosure provide, but are not limited to the following method. In the first method, the user may touch a corresponding button, and the electronic device may generate the switching instruction. In the second method, the user may issue a fourth voice message, and the electronic device may use the fourth voice message as the switching instruction. In the third method, the user may issue a fourth predetermined gesture, and the electronic device may generate the switching instruction after acquiring the fourth predetermined gesture. In the third method, if the user's detected fourth touch information satisfies a fourth predetermined condition, the switching instruction may be acquired. The fourth touch information may include one or more of a touch duration, a touch strength, and a touch trajectory.

In some embodiments, when images are acquired by the one or more first image acquisition devices and the one or more second image acquisition devices, a first image acquired by the one or more first image acquisition devices and/or a second image acquired by the one or more second image acquisition devices may be previewed on the electronic device. The multitasking management module may perform task switching on the preview image to switch the images corresponding to the first task and the second task, respectively.

In some embodiments, the preview image on the electronic device may include an image acquired by an image acquisition device called by a function module. Further, the button for switching tasks may be arranged on the preview image, and a switching instruction may be generated by touching the button to switch between the first task and the second task.

FIGS. 6a-6d are diagrams illustrating a process of switching between a first task and a second task. Assuming the electronic device used by the user is a smartphone and the current preview image shown in FIG. 6I is the first image corresponding to the first task. In addition, the preview image of the electronic device shown in FIG. 6a further includes a "task switching" virtual button.

Figure 6A:
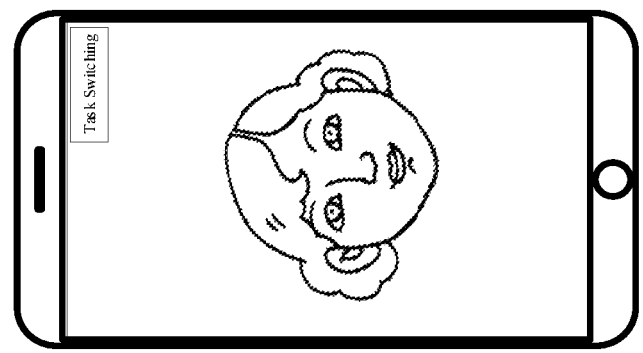
FIGS. 6a-6d are diagrams illustrating a process of switching between a first task and a second task.
Figure 6B:
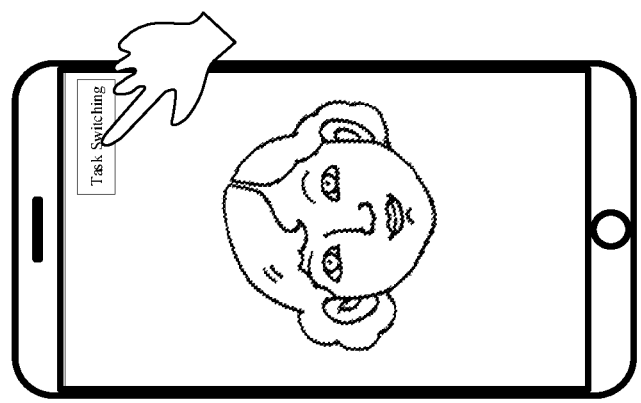
Figure 6C:
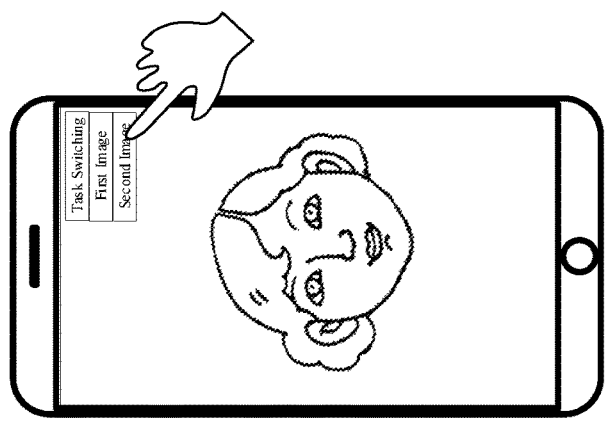

The user may touch the "task switching" virtual button shown in FIG. 6a to display a drop-down menu. The drop-down menu includes: a first image and a second image.

Figure 6D:
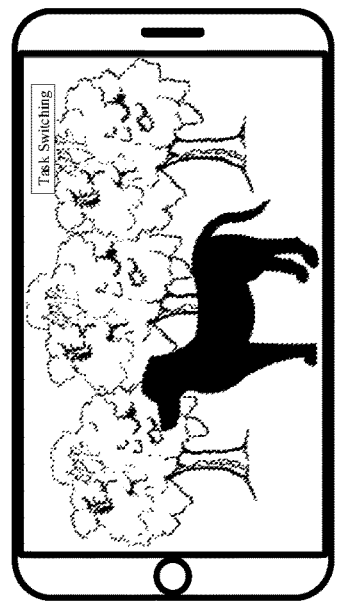

If the user clicks the second image, the electronic device may switch the currently displayed first image to the second image, such as the second image shown in FIG. 6d, thereby completing the switch between the first task and the second task.

In some embodiments, the preview image on the electronic device may include both the first image acquired by the one or more first image acquisition devices and the second image acquired by the one or more second image acquisition devices.

In some embodiments, a first area of the electronic device may display the first image, and a second area of the electronic device may display the second image. In some embodiments, the first area may be a partial area of the second area, or, the second area may be a partial area of the first area, or, the first area may be independent of the second area.

Figure 7A:
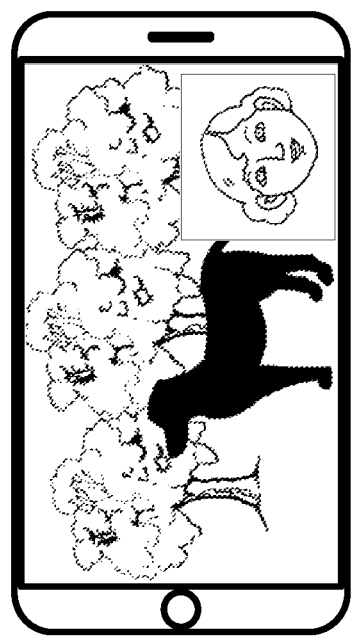
FIGS. 7a-7c are diagrams illustrating another process of switching between the first task and the second task.
Figure 7B:
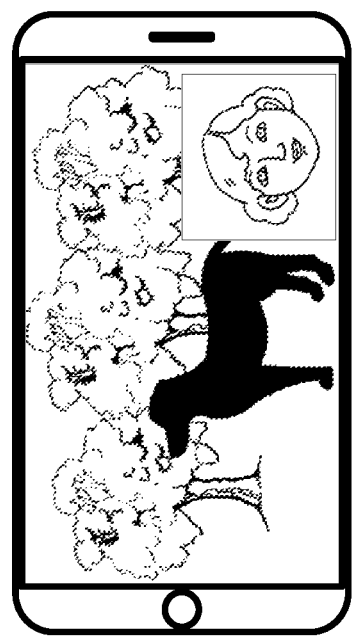
Figure 7C:
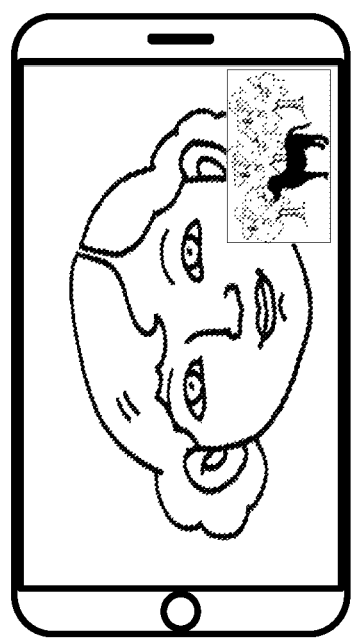

FIGS. 7a-7c are diagrams illustrating another process of switching between the first task and the second task.

Assuming the image shown in FIG. 7a including a tree and a dog is the first image acquired by the one or more first image acquisition devices, and a person's image is the second image acquired by the one or more second image acquisition devices.

If the user needs to switch the first image and the second image, the user may click anywhere on the second image, as shown in FIG. 7b. As such, the interface may be switched from FIG. 7a the interface shown in FIG. 7c, thereby completing the switch between the first task and the second task.

In some embodiments, the application in the foregoing embodiments of the present disclosure may be any application related to the camera. As such, the embodiment of the present disclosure may also store images. The specific process may be as follow.

E1, storing images acquired by the first function module through the one or more first image acquisition devices.

In some embodiments, it can be understood that for any application related to the camera, the images acquired by the camera need to be stored. If the application is any application related to the camera, then E1 may be performed to store images acquired by the first function module through the one or more first image acquisition devices, such that the user may view the images.

In some embodiments, many methods may be used to store images acquired by the first function module through the one or more first image acquisition devices. The embodiments of the present disclosure provide, but are not limited to, the following methods.

In the first method, the acquired images may be stored locally, that is, stored in an electronic device.

In the second method, the acquired images may be stored in the cloud, and when the user needs the acquired images, the acquired images may be downloaded from the cloud.

In the third method, the acquired images may be stored in other electronic devices associated with the current electronic device, and when the user needs the acquired images, the acquired images may be acquired from the other electronic devices. The other electronic devices associated with the current electronic device may be devices that are connected to the current electronic device. In some embodiments, the current electronic device may be connected to the other electronic devices through a local area network, Bluetooth, or a data transmission line. In some embodiments, when the application of the electronic device is an instant messaging application, the acquired images may be stored on a server where the instant messaging application is located.

For example, assuming that when a user takes a picture through a camera application, the beauty function module and the panoramic function module may be executed. In particular, the beauty function module (the first function module) may acquire images through one or more first image acquisition devices, and the images acquired by the first image acquisition devices may be stored in the cloud or locally. Similarly, the images acquired by panoramic function module (the second function module) through one or more second image acquisition devices may also be stored in the cloud or locally.

In another example, assuming that when user A makes a video call with user B through an instant messaging application, the video communication function module may be executed. In particular, for user A, the video communication function module (the first function module) may acquire images through one or more first image acquisition devices, and the images acquired by the first image acquisition devices may be stored in the cloud, locally, or in user B's electronic device.

E2, storing images acquired by the second function module through the one or more second image acquisition devices such that the user may view the images separately.

The implementation method of E2 may correspond to E1. For detail, reference may be made to the description of E1, and details will not be described herein again.

In another embodiment, the first function module and the second function module may belong to different applications. For example, the first function module may belong to the first application, the second function module may belong to the second application, and the first application may be different from the second application.

The control method of the present disclosure will be described below when the first function module and the second function module belong to different applications.

Figure 8:
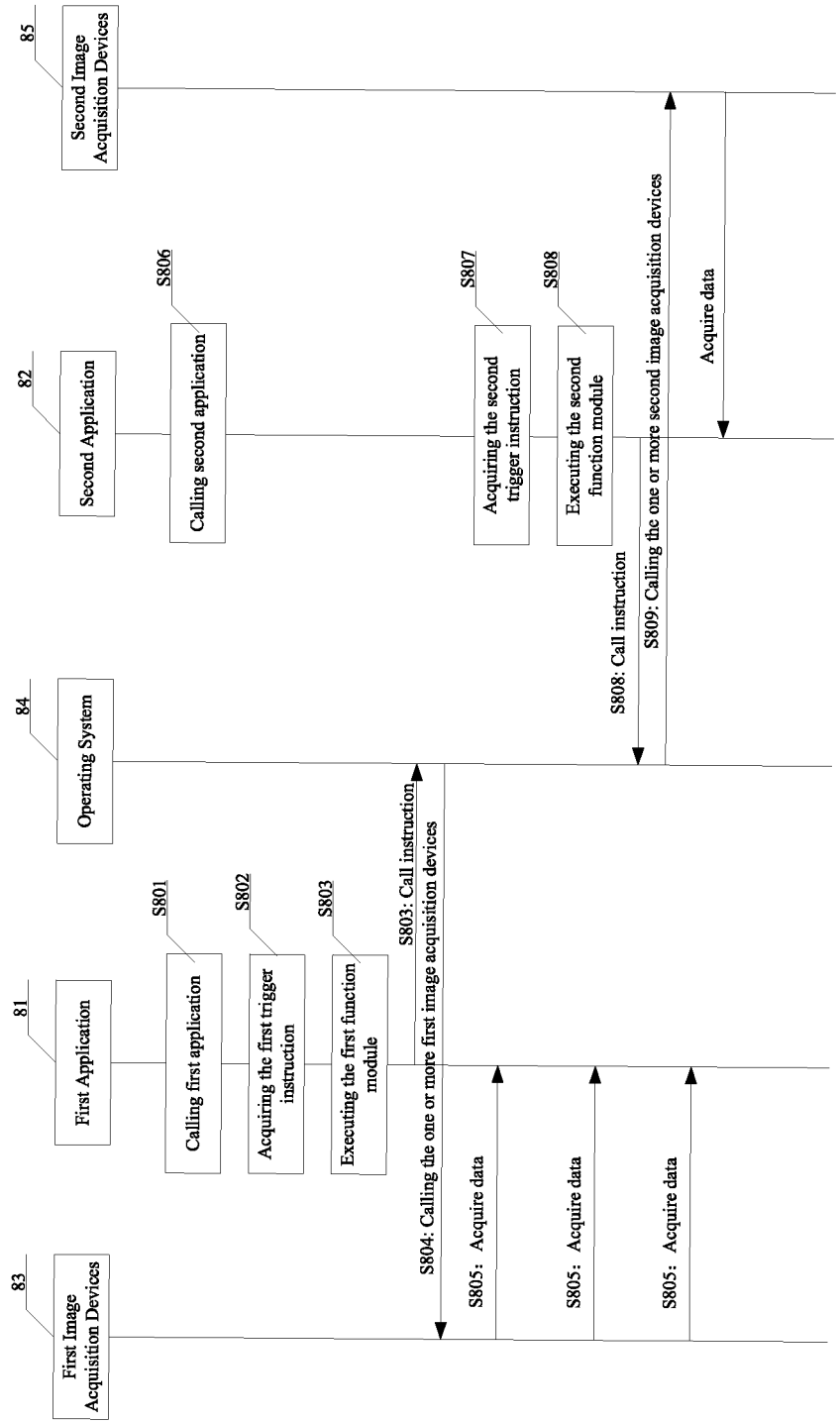
FIG. 8 is signal diagram of an implementation method of the control method according to an embodiment of the present disclosure.

FIG. 8 is signal diagram of an implementation method of the control method according to an embodiment of the present disclosure. The control method will be described in detail below.

S801, calling a first application 81.

In some embodiments, calling the first application may be that the user issues a fifth voice message, a fifth predetermined gesture, or fifth touch information to start the first application, such that the first application may be in an operating state.

S802, the first application 81 acquires the first trigger instruction.

For details, reference may be made to the description of S200, which will not be repeated here.

S803, the first application 81 executes the first function module in response to the first trigger instruction, the first application calls the one or more first image acquisition devices 83.

In some embodiments, the first function module may send a call instruction to the first image acquisition devices.

S804, the first application 81 requests to call the one or more first image acquisition devices through an operating system 84.

S805, the first application 81 acquires acquisition data acquired by the one or more first image acquisition devices based on the feedback of the request.

In some embodiments, the one or more first image acquisition devices may directly send the acquired acquisition data to the first application. In some embodiments, the one or more first image acquisition devices may send the acquired acquisition data to the operating system, and the operating system may send the acquired acquisition data to the first application.

It can be understood that during the process in which the first application calls the one or more first image acquisition devices, the one or more first image acquisition devices may continuously send the data acquired by the one or more first image acquisition devices to the first application. As such, a plurality of S805s corresponding to different times are shown in FIG. 8.

In some embodiments, the first application 81 may be in an operating state, and may initiate a request for calling the one or more first image acquisition devices to an operating system of the electronic device. After receiving the request, the operating system may detect whether the one or more first acquisition devices to be called are idle. In response to the one or more first acquisition devices being idle, the one or more first acquisition devices may be assigned to the first application. That is, the first application may acquire images through the one or more first acquisition devices.

Alternatively, the operating system may send the request to a hardware resource management module, and the hardware resource management module may detect whether the one or more first acquisition devices to be called are idle.

If the operating system assigns the one or more first acquisition devices to the first application 81, the first application 81 may acquire data through one or more first acquisition devices.

S806, calling a second application 82.

In some embodiments, calling the first application may be that the user issues a sixth voice message, a sixth predetermined gesture, or sixth touch information to start the second application, such that the second application may be in an operating state.

It should be noted that S801 and S806 may be performed simultaneously, or S806 may be perform first, or S801 may be performed first.

S807, the second application 82 acquires the second trigger instruction during the operation of the first function module.

For details, reference may be made to the description of S220, which will not be repeated here.

S808, the second application 82 executes the second function module in response to the second trigger instruction, the second application calls the one or more second image acquisition devices 85.

In some embodiments, second application may send a call instruction to the second image acquisition devices.

S809, the second application 82 requests to call the one or more second image acquisition devices through an operating system.

S810, the second application determines whether to acquire acquisition data acquired by the one or more second image acquisition devices based on the feedback of the request.

In some embodiments, the second application 82 may be in an operating state, and may initiate a request for calling the one or more second image acquisition devices to an operating system of the electronic device. After receiving the request, the operating system may detect whether the one or more second acquisition devices to be called are idle. In response to the one or more second acquisition devices being idle, the one or more second acquisition devices may be assigned to the second application. That is, the second application may acquire images through the one or more second acquisition devices.

Alternatively, the operating system may send the request to a hardware resource management module, and the hardware resource management module may detect whether the one or more second acquisition devices to be called are idle.

If the operating system assigns the one or more second acquisition devices to the second application 82, the second application 82 may acquire data through one or more second acquisition devices.

The method shown in FIG. 8 will be described below using the first application as a camera application and the second application as an instant messaging application as an example.

Figure 9A:
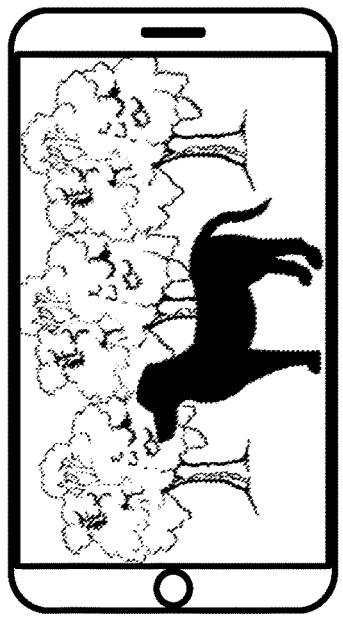
FIGS. 9a-9c are diagrams illustrating a process of executing a first application and a second application in an unlocked state.
Figure 9B:
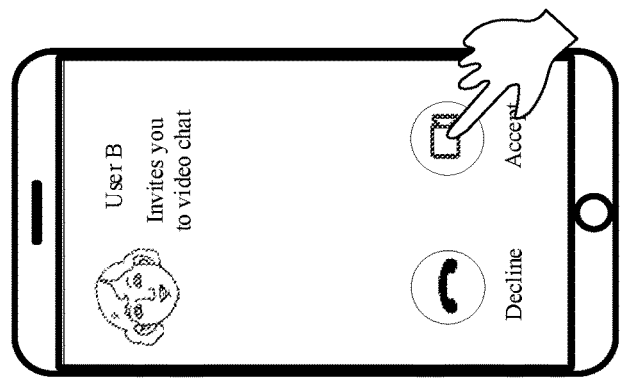
Figure 9C:
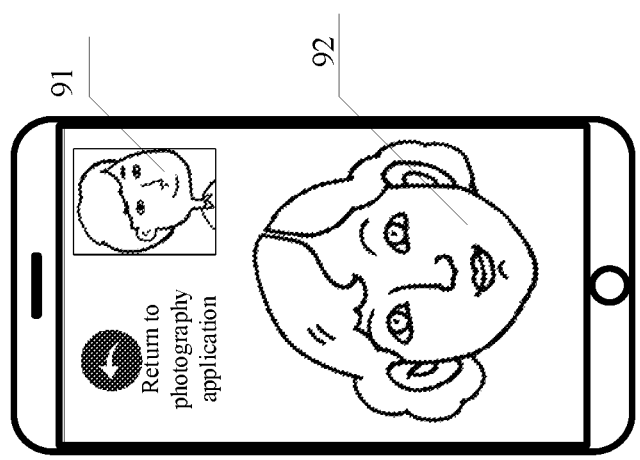

Referring to FIGS. 9a-9c. In FIG. 9a, user A is recording a video using the video function module in the camera application. The electronic device in FIG. 9a may display an image acquired by one or more first image acquisition devices called by the camera application, that is, an image including a tree and a dog. In FIG. 9b, the electronic device receives a video call request from user B to user A via the instant messaging application. Assuming the person's image shown in FIG. 9b is the image of user B, as shown in FIG. 9c, after the user clicks the accept button, the instant messaging application may call one or more first image acquisition devices to acquire images. For example, using the front camera to acquire a face image 91 of user A. In some embodiments, a face image 92 shown in FIG. 9c may be a video image transmitted by user B's electronic device in real time.

In some embodiments, the electronic device may display a virtual button for returning to the interface corresponding to the first application, as the "return to camera application" virtual button shown in FIG. 9c.

The following embodiment is described by using the first application as a camera application and the second application as a face unlocking application as an example.

Figure 10A:
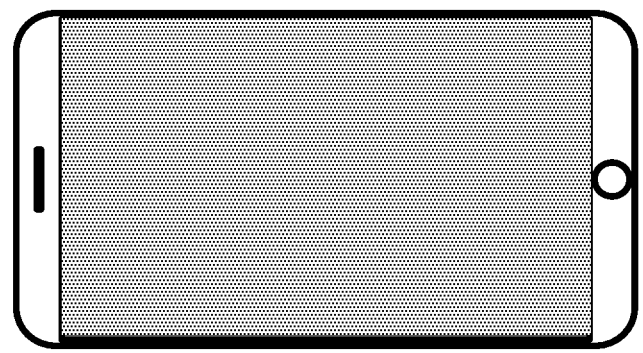
FIGS. 10a-10e are diagrams illustrating a process of executing the first application and the second application in a locked state.
Figure 10B:
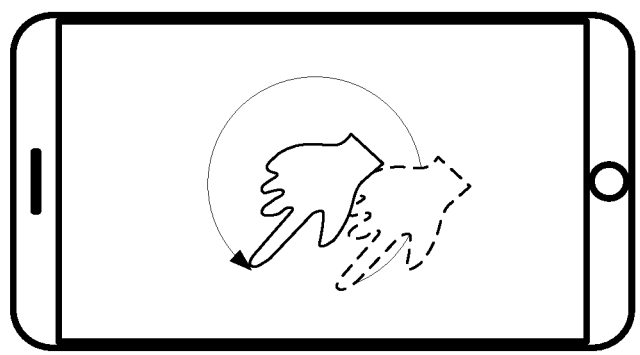
Figure 10C:
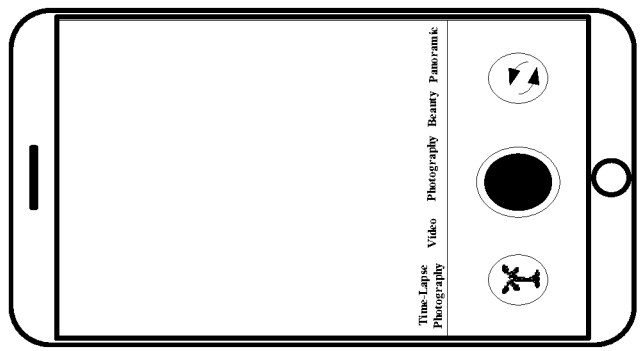

Referring to FIGS. 10a-10e. FIG. 10a is a diagram illustrating an electronic device in an unlocked state. When the electronic device is in an unlocked state, the electronic device may be in a screen-off state. As shown in FIG. 10a, the electronic device is in a screen-off state. The user can input the corresponding operation on the touch screen of the electronic device. For example, in the touch track shown in FIG. 10b, when the electronic device is in an unlocked state, a "circle" touch track is entered on the touch screen of the electronic device to call a camera application. After the camera application is successfully called, the interface shown in FIG. 10c may be displayed.

Figure 10D:
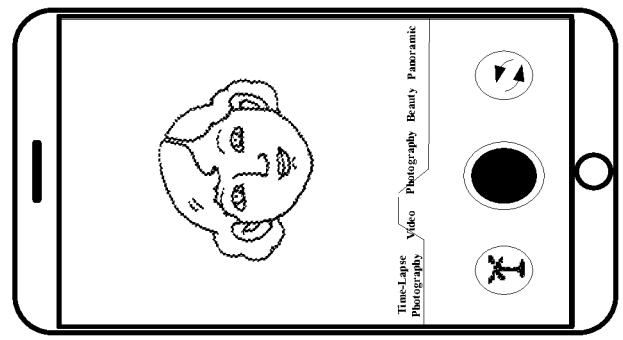

If the user touches the "video" virtual button corresponding to the "video function module", the camera application may use the video function module to call one or more first image acquisition devices. Assuming the face image is acquired by the one or more first image acquisition devices, the electronic device may display the face image, as shown in FIG. 10d.

Figure 10E:
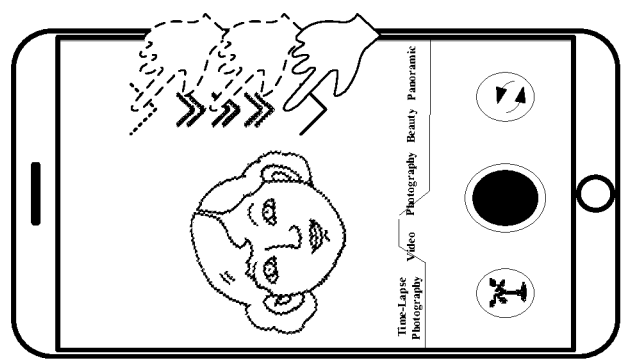

If the user wants to unlock the electronic device at this time, in some embodiments, the user may enter a corresponding operation to call the face unlocking application. As shown in FIG. 10e, by using the swipe down operation, the face recognition and unlocking application may be called. The face unlocking application may light the user's face with, for example, a 3D structure light. Further, the face unlocking application may call one or more second image acquisition devices to acquire a user's face structure image. If the acquired face structure image successfully matches the pre-stored face structure image, the electronic device may be successfully unlocked.

In some embodiments, in the unlocking process of the face unlocking application, the electronic device may continue to display the images acquired by the camera application. In some embodiments, if the face unlocking application cannot detect the face, the face unlocking application may display a message that the face cannot be detected. In some embodiments, if the face structure image acquired by the face unlocking application successfully matches the pre-stored face structure image, the face unlocking application may display a message for a successful unlocking.

The control method is described in detail in the previous embodiments of the present disclosure. The control method in the embodiments of the present disclosure may be implemented by using various forms of apparatuses. Therefore, an embodiment of the present disclosure further provides an apparatus.

Figure 11:
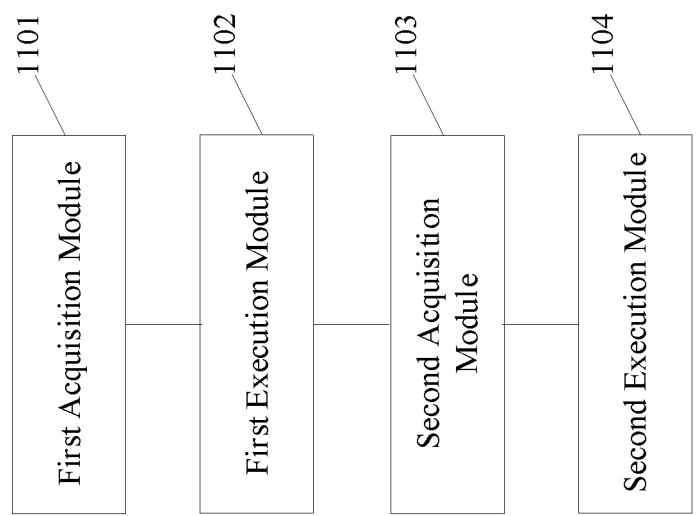
FIG. 11 is a structural diagram of a control apparatus according to an embodiment of the present disclosure.

FIG. 11 is a structural diagram of a control apparatus according to an embodiment of the present disclosure.

As shown in FIG. 11, the control apparatus includes a first acquisition module 1101 configured to acquire a first trigger instruction; a first execution module 1102 configured to execute a first function module in response to the first trigger instruction, the first function module may call one or more first image acquisition devices; a second acquisition module 1103 configured to acquire a second trigger instruction during the operation of the first function module; and a second execution module 1104 configured to execute a second function module in response to the second trigger function, the second function module may call one or more second image acquisition devices, and the first function module may be different from the second function module.

In some embodiments, the one or more first image acquisition devices and the one or more second image acquisition devices may be connected to the same electronic device.

In some embodiments, the first function module in the first execution module and the second function module in the second execution module may belong to different function modules of the same application. Or, the first function module in the first execution module may belong to the first application, the second function module in the second execution module may belong to the second application, the first application being different from the second application.

In some embodiments, the control apparatus may further include an application calling unit configured to call an application, the application may include at least the first function module and the second function module.

The first trigger instruction in the first acquisition module may be a trigger instruction determined based on the acquired first input operation, and the first input operation may be used to select the first function module of the application. Further, the second trigger instruction in the second acquisition module may be a trigger instruction determined based on the acquired second input operation, and the second input operation may be used to select the second function module of the application.

In some embodiments, the application may include a multitasking management module.

The first execution module may include a first creation unit for the multitasking management module to create a first task for the first function module based on the first trigger instruction such that the first function module may be executed; and a first calling unit configured to call the one or more first image acquisition devices when the first function module is in an operating state.

The second execution module may include a second creation unit for the multitasking management module to create a second task for the second function module based on the second trigger instruction such that the second function module may be executed; and a second calling unit configured to call the one or more second image acquisition devices when the second function module is in an operating state.

In some embodiments, the second creation unit may include a first device determination unit configured to determine the one or more second image acquisitions to be called by the second function module; and a first conflict reference unit configured to create a second task for the second function module if the one or more second image acquisition devices do not conflict with the one or more first image acquisition devices. Alternatively, the second creation unit may include a coexistence reference unit configured to create a second task for the second function module if the second function module and the first function module satisfy a coexistence condition. In some embodiments, the second creation unit may include a second device determination unit configured to determine the one or more second image acquisitions to be called by the second function module; a second conflict reference unit configured to determine a conflicting target image acquisition device if the one or more second image acquisition devices conflict with the one or more first image acquisition devices; and a function reference unit configured to create a second task for the second function module if the target conflicting image acquisition device set by the second function module is consistent with the function of the target image acquisition device set by the first function module.

In some embodiments, the control apparatus may further includes a task switching unit configured to switch the first task and the second task in response to the multitasking management module acquiring a switching instruction.

In some embodiments, the application may be any application related to the camera.

In some embodiments, the control apparatus may further includes a first image storage unit configured to store images acquired by the first function module through the one or more first image acquisition devices; and a second image storage unit configured to store images acquired the by the second function module through the one or more second image acquisition devices such that users may view the images separately.

In some embodiments, the first execution module may include a first execution unit configured to respond to the first trigger instruction. A first application may execute the first function module, and the first application may call the one or more first image acquisition devices.

In particular, the first execution unit may include a firsts calling subunit configured to request the first application to call the one or more first image acquisition devices through an operating system; and a first acquisition subunit configured to acquire, by the first application, acquisition data acquired by the one or more first image acquisition devices based on the feedback of the request.

In some embodiments, the second execution module may include a first execution unit configured to respond to the second trigger instruction. A second application may execute the second function module, and second first application may call the one or more second image acquisition devices.

In particular, the first execution unit may include a second calling subunit configured to request the second application to call the one or more second image acquisition devices through an operating system; and a second acquisition subunit configured to acquire, by the second application, acquisition data acquired by the one or more second image acquisition devices based on the feedback of the request.

Figure 12:
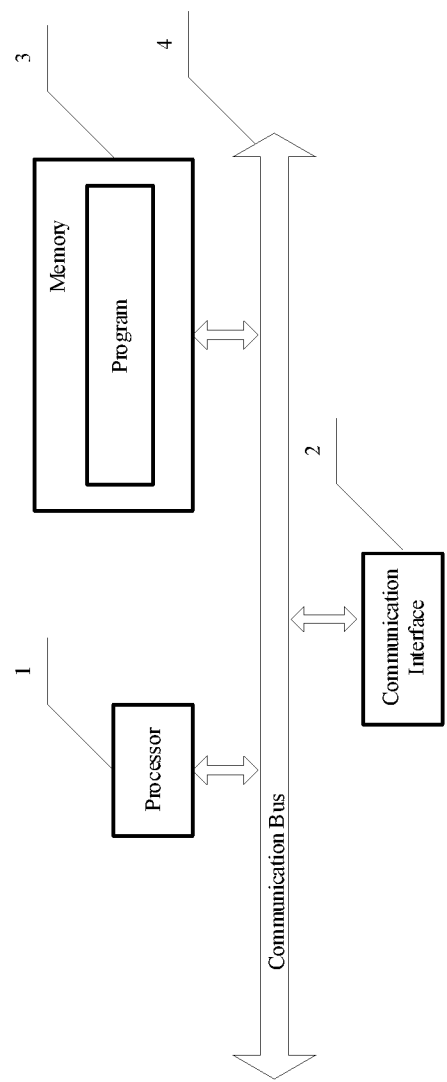
FIG. 12 is a hardware structural block diagram of the control apparatus according to an embodiment of the present disclosure.

The control apparatus provided in the embodiments of the present disclosure can be applied to control devices, such as a mobile terminal, a PC terminal, a cloud platform, and a server cluster. In some embodiments, FIG. 12 illustrates a hardware structural block diagram of the control apparatus according to an embodiment of the present disclosure. As shown in FIG. 12, the hardware structure of the control device includes one or more processors 1, one or more communication interfaces 2, one or more memories 3, and one or more communication buses 4.

In the embodiments of the present disclosure, the number of the processor 1, the communication interface 2, the memory 3, and the communication bus 4 is at least one, and the processor 1 the communication interface 2, and the memory 3 may communication with each other through the communication bus 4.

The processor 1 may be a central processing unit (CPU), an application specific integrated circuit (ASIC), one or more integrated circuits configured to implement the embodiments of the present disclosure, an embedded controller (EC), or a processing component, etc.

The memory 3 may include a high-speed RAM memory, and may also include a non-volatile memory, for example, one or more disk storages.

The memory may be used to store a program, and the processor may call the program stored in the memory. The program may be used to acquire the first trigger instruction; execute the first function module in response to the first trigger instruction, the first function module may call one or more first image acquisition devices; acquire the second trigger instruction during the operation of the first function module; execute the second function module in response to the second trigger instruction, the second function module may call one or more second image acquisition devices, and the first function module may be different from the second function module.

In some embodiments, the one or more first image acquisition devices and the one or more second image acquisition devices may be connected to the same electronic device.

For detailed and extended function of the program, reference may be made to the description above, and details will not be repeated herein again.

It will be appreciated that, embodiment as described hereinabove can be provided in a progressive manner. The description of respective embodiment may emphasize a difference of the embodiment over others, a reference to other embodiments can be made for those same or similar components. A description of device and system embodiments can be simplified in view of a similarity with method embodiments, and a reference to description of the method embodiments can be made.

It should be understood that in the present disclosure, relational terms such as first and second, etc., are only used to distinguish an entity or operation from another entity or operation, and do not necessarily imply that there is an actual relationship or order between the entities or operations. The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item.

Methods or algorithms described in embodiments of the disclosure can be implemented with a hardware, a software module executed by a processor, or a combination thereof. The software module can be stored in a random access memory (RAM), an internal memory, a read-only memory (ROM), an electrically-programmable ROM, an electrically-erasable programmable ROM, a register, a hard disk, a removable disk, a CD-ROM or a storage medium of any other forms known in the art.

Embodiments are disclosed to enable those skilled in the art to implement or use the disclosure. Various modifications to the embodiments can be apparent to those skilled in the art. The general principles as defined herein can be implemented in other embodiments without departing from the spirit or scope of the disclosure. The disclosure is not intended to be limited to the illustrated embodiments but can be interpreted as the widest scope consistent with the principles and novel features as disclosed.

What is claimed is:

1. A control method comprising:
    calling an application including at least a first function module, a second function module, and a multitasking management module;
    acquiring a first trigger instruction;
    executing the first function module in response to the first trigger instruction, the first function module calling one or more first image acquisition devices, and executing the first function module including:
        creating a first task for the first function module by using the multitasking management module based on the first trigger instruction to execute the first function module;
    acquiring a second trigger instruction during the operation of the first function module; and
    executing the second function module in response to the second trigger instruction, the second function module calling one or more second image acquisition devices, and executing the second function module including:
        creating a second task for the second function module by using the multitasking management module based on the second trigger instruction to execute the second function module, including:
            determining the one or more second image acquisition devices to be called by the second function module;
            determining a conflicting target image acquisition device in response to the one or more second image acquisition devices conflicting with the one or more first image acquisition devices; and
            generating the second task for the second function module in response to a function of a target image acquisition device set by the second function module being consistent with a function of the target image acquisition device set by the first function module;
    wherein the first function module is different from the second function module, and the one or more first image acquisition devices and the one or more second image acquisition devices are connected to a same electronic device.

2. The method of claim 1, wherein the first function module and the second function module belong to different function modules of the application.

3. The method of claim 1, wherein the first trigger instruction is a trigger instruction determined based on an acquired first input operation used to select the first function module of the application, and the second trigger instruction is a trigger instruction determined based on an acquired second input operation used to select the second function module of the application.

4. The method of claim 1, wherein:
the executing the first function module in response to the first trigger instruction further includes calling the one or more first image acquisition devices in response to the first function module being in the operating state; and
the executing the second function module in response to the second trigger instruction further includes calling the one or more second image acquisition devices in response to the second function module being in the operating state.

5. The method of claim 1, wherein creating the second task for the second function module by using the multitasking management module based on the second trigger instruction further includes:
determining the one or more second image acquisition devices to be called by the second function module, and generating the second task for the second function module in response to the one or more second image acquisition devices not conflicting with the one or more first image acquisition devices; or
generating the second task for the second function module in response to the one or more first image acquisition devices and the one or more second image acquisition devices satisfying a coexistence condition.

6. The method of claim 1, further comprising:
switching the first task to the second task in response to the multitasking management module acquiring a switching instruction.

7. The method of claim 1, wherein the application is any application related to a camera; and the method further includes:
storing images acquired by the first function module through the one or more first image acquisition devices; and
storing images acquired by the second function module through the one or more second image acquisition devices users to view the images separately.

8. The method of claim 1,
wherein executing the first function module in response to the first trigger instruction includes executing the first function module using the application in response to the first trigger instruction, the application calling the one or more first image acquisition devices, including:
requesting the one or more first image acquisition devices through an operating system by using the application; and
acquiring, by the application, acquisition data acquired by the one or more first image acquisition devices based on a request feedback; and
the method further comprising:
calling another application including a third function module; and
executing the third function module using the another application in response to a third trigger instruction, the another application calling the one or more second image acquisition devices, including:
requesting the one or more second image acquisition devices through the operating system by using the another application; and
acquiring, by the another application, acquisition data acquired by the one or more second image acquisition devices based on the request feedback;
wherein the first function module being different from the third function module.

9. An electronic device comprising:
a memory storing a program;
a processor configured to execute the program to:
call an application including at least a first function module, a second function module, and a multitasking management module;
acquire a first trigger instruction;
execute the first function module in response to the first trigger instruction, the first function module calling one or more first image acquisition devices, and executing the first function module including:
creating a first task for the first function module by using the multitasking management module based on the first trigger instruction to execute the first function module;
acquire a second trigger instruction during the operation of the first function module; and
execute the second function module in response to the second trigger instruction, the second function module calling one or more second image acquisition devices, and executing the second function module including:
creating a second task for the second function module by using the multitasking management module based on the second trigger instruction to execute the second function module, including:
determining the one or more second image acquisition devices to be called by the second function module;
determining a conflicting target image acquisition device in response to the one or more second image acquisition devices conflicting with the one or more first image acquisition devices; and
generating the second task for the second function module in response to a function of a target image acquisition device set by the second function module being consistent with a function of the target image acquisition device set by the first function module;
wherein the first function module is different from the second function module, and the one or more first image acquisition devices and the one or more second image acquisition device are connected to the electronic device.

10. The electronic device of claim 9, wherein the first function module and the second function module belong to different function modules of the application.

11. The electronic device of claim 9, wherein the first trigger instruction is a trigger instruction determined based on an acquired first input operation used to select the first function module of the application, and the second trigger instruction is a trigger instruction determined based on an acquired second input operation used to select the second function module of the application.

12. The electronic device of claim 9, wherein:
to execute the first function module in response to the first trigger instruction, the processor is further configured to call the one or more first image acquisition devices in response to the first function module being in the operating state; and
to execute the second function module in response to the second trigger instruction, the processor is further configured to call the one or more second image acquisition devices in response to the second function module being in the operating state.

13. The electronic device of claim 9, wherein to generate the second task for the second function module by using the multitasking management module based on the second trigger instruction, the processor is further configured to:
- determine the one or more second image acquisition devices to be called by the second function module, and generate the second task for the second function module in response to the one or more second image acquisition devices not conflicting with the one or more first image acquisition devices; or
- generate the second task for the second function module in response to the one or more first image acquisition devices and the one or more second image acquisition devices satisfying a coexistence condition.

14. The electronic device of claim 9, wherein the processor is further configured to:
- switch the first task to the second task in response to the multitasking management module acquiring a switching instruction.

15. The electronic device of claim 9, wherein the application is an application related to a camera; and the processor is further configured to:
- store images acquired by the first function module through the one or more first image acquisition devices; and
- store images acquired by the second function module through the one or more second image acquisition devices users to view the images separately.

16. The electronic device of claim 9, wherein to execute the first function module in response to the first trigger instruction, the processor is further configured to:
- execute the first function module using the application in response to the first trigger instruction, the application calling the one or more first image acquisition devices.

17. The electronic device of claim 16, wherein to call the one or more first image acquisition devices using the application, the processor is further configured to:
- request the one or more first image acquisition devices through an operating system by using the application; and
- acquire, by the application, acquisition data acquired by the one or more first image acquisition devices based on a request feedback.

18. The electronic device of claim 17, wherein the processor is further configured to:
- call another application including a third function module;
- execute the third function module using the another application in response to a third trigger instruction, and call the one or more second image acquisition devices using the another application;
- wherein the first function module is different from the third function module.

19. The electronic device of claim 18, wherein to call the one or more second image acquisition devices using the another application, the processor is further configured to:
- request the one or more second image acquisition devices through the operating system by using the another application; and
- acquire, by the another application, acquisition data acquired by the one or more second image acquisition devices based on the request feedback.

* * * * *